(12) United States Patent
Morgan et al.

(10) Patent No.: US 8,596,560 B2
(45) Date of Patent: Dec. 3, 2013

(54) CHECK VALVE

(71) Applicants: Stuart Morgan, Moorabbin (AU); Sean Morgan, Moorabbin (AU)

(72) Inventors: Stuart Morgan, Moorabbin (AU); Sean Morgan, Moorabbin (AU)

( * ) Notice: Subject to any disclaimer, the term of this patent is extended or adjusted under 35 U.S.C. 154(b) by 0 days.

(21) Appl. No.: 13/650,067

(22) Filed: Oct. 11, 2012

(65) Prior Publication Data
US 2013/0240060 A1  Sep. 19, 2013

Related U.S. Application Data

(62) Division of application No. 11/832,776, filed on Aug. 2, 2007, now abandoned.

(51) Int. Cl.
*F16K 15/00* (2006.01)
*F16K 31/44* (2006.01)
*B05B 1/30* (2006.01)

(52) U.S. Cl.
USPC ............. 239/570; 55/420; 251/227; 137/511

(58) Field of Classification Search
USPC .................... 239/570; 55/420; 251/226, 227; 137/511, 517, 524, 601.2
See application file for complete search history.

(56) References Cited

U.S. PATENT DOCUMENTS

| | | | |
|---|---|---|---|
| 2,279,002 A | | 4/1942 | MacNeil et al. |
| 2,479,620 A | * | 8/1949 | Ingham, Jr. .................... 137/523 |
| 2,556,050 A | | 6/1951 | Ziherl |
| 2,590,772 A | * | 3/1952 | Joyce ............................ 239/464 |
| 3,590,770 A | * | 7/1971 | Wagner ........................ 116/112 |
| 4,588,132 A | | 5/1986 | Neitz et al. |
| 4,624,413 A | | 11/1986 | Corsette |
| 4,805,664 A | * | 2/1989 | Mattei et al. ............. 137/543.23 |
| 4,834,286 A | | 5/1989 | Sulz |
| 5,234,166 A | | 8/1993 | Foster et al. |
| 5,941,456 A | | 8/1999 | Waryu et al. |

FOREIGN PATENT DOCUMENTS

WO  WO 96/01666 A1  1/1996
WO  WO 96/31285 A1  10/1996

* cited by examiner

*Primary Examiner* — Len Tran
*Assistant Examiner* — Justin Jonaitis
(74) *Attorney, Agent, or Firm* — Edwin D. Schindler

(57) ABSTRACT

A check valve which includes a body adapted at one end to receive a liquid source and at the other end to engage with a spray nozzle and having a bore therethrough, an internal annular recess within the body, the upstream end of which body provides a valve seat, a valve assembly located in the recess and having a valve member having a generally curved end directed towards the seat and bias means to normally hold the member against the seat until the pressure at the inlet reaches a pre-determined minimum.

14 Claims, 4 Drawing Sheets

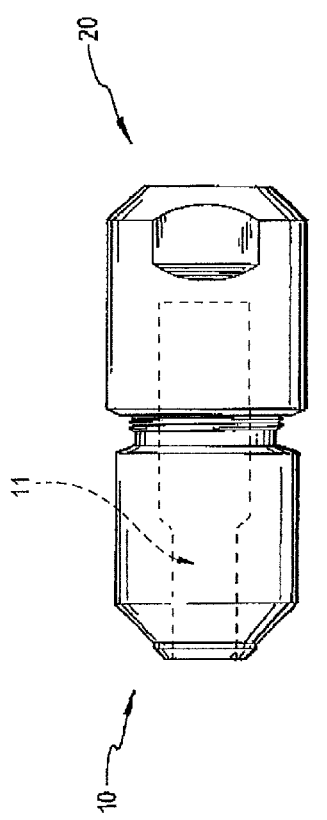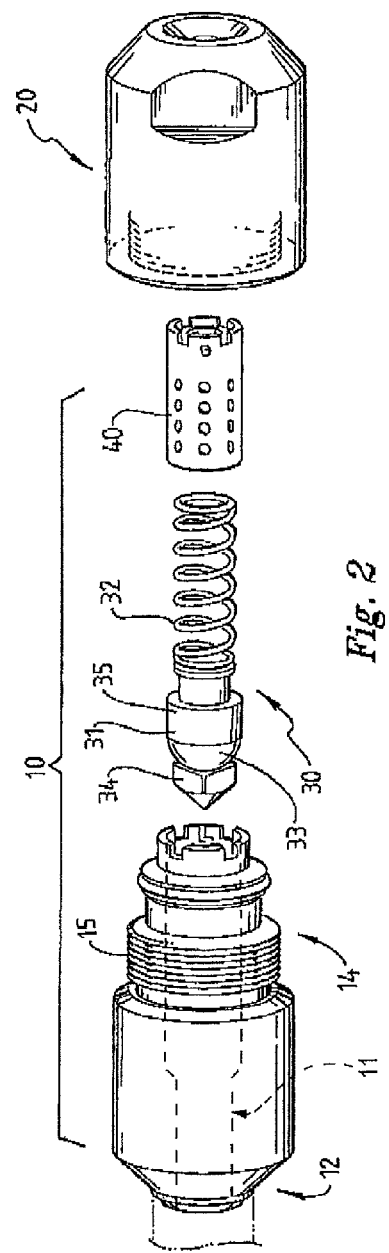

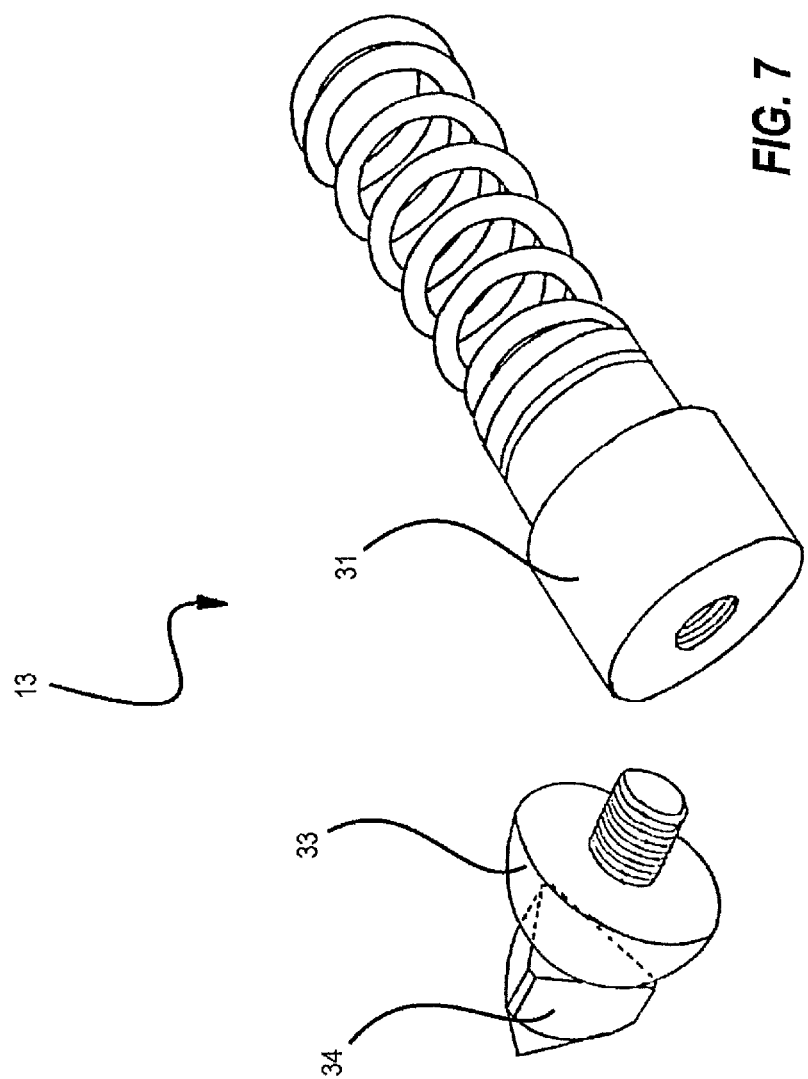

CHECK VALVE

CROSS-REFERENCE TO PRIOR APPLICATION

This is a division of application Ser. No. 11/832,776, filed Aug. 2, 2007.

AREA OF THE INVENTION

This invention relates to a check valve which is specifically adapted to be used with spray drying nozzles, but could also be used in association with other nozzles.

BACKGROUND TO THE INVENTION

For ease of description, we shall refer to the valve when associated with spray drying of milk.

Spray drying techniques are well known and in these milk is sprayed through nozzles into a chamber where the liquid part of the milk is evaporated away and milk powder either falls to the floor of the chamber and is removed therefrom.

Historically, on completion of operation the spray drying industry simply stopped pumping the liquid through the nozzles and as the pressure dropped, a certain percentage of the liquid simply fell as drops from the nozzles, without being atomized, and this material could well lead to pollution of the product in the chamber.

Check valves have been proposed but in practice have suffered from major disadvantages.

A first such disadvantage is that the valves caused a limitation in liquid flow therethrough and there was a large pressure drop over the valve. This meant that in order to operate a plant to capacity, it was either necessary to use higher pressures or larger diameter pipes and valves to enable the optimum flow through the nozzles.

The second disadvantage was that these valves normally had a soft seal, such as an O-ring and it was found, in practice, that this seal could be destroyed during use which would enable parts of the O-ring to pass to the chamber, again polluting the product.

In fact most of these check valves have had a complex design which requires the use of many seals and multiple sealing points. As a result there are many stagnant points such that milk products can build up and, if overheated, catch fire. Additionally soft seals are prone to failure and consequent leakage. As such check valves are generally welded together any repairs are extremely difficult.

Other check valves have used metal to metal seals which increases the wear rate and as discussed above access for repair is difficult in conventional valves.

An additional disadvantage with previous check valves is that as fluid flow is not necessarily smooth through them and stagnant deposits can form they are difficult to keep clean.

OUTLINE OF THE INVENTION

An object of the invention is to provide a check valve for spray drying nozzles, and other nozzles, which causes little restriction in the flow through the nozzle but which, at the same time, does not have any parts which are likely to be passed into the fluid stream.

A further object of the invention is to provide such a check valve which can remain in situ while the system is cleaned and which can also permit interchange of nozzles without the valve itself being disturbed. Another object of the invention is to provide such a valve which is easily cleaned.

The invention is a check valve in a spray nozzle assembly which includes a body adapted at one end to receive a liquid source and at the other end to engage with a spray nozzle and having a bore therethrough, said bore having a first component adjacent the upstream end of the body said first component having a smaller diameter than a second downstream component such that a valve seat is provided at the junction of these components, a valve assembly located generally in the second component and having a valve member having a generally curved end directed towards the seat and bias means to normally hold the member against the seat until the pressure at the inlet reaches a pre-determined minimum.

It is preferred that the curved end of the valve member be either generally hemispherical or conical in shape.

It is also preferred that the curved end of the valve member be manufactured from some sacrificial material and that this end form a seal with the valve seat when the valve is closed.

It may also be preferred that the valve seat be a removable and replaceable component.

It may further be preferred that the valve seat be provided with an O ring seal to the body to prevent any leakage during the sealing phase.

It is further preferred that the valve member be provided with guide means to locate it axially within the annular recess such that liquid can flow around the valve member when the valve is in its open position and that this guide means preferably be adjacent the curved end of the valve member.

It is further preferred that this guide means have a plurality of arms extending from an axial portion to the sides of the first bore component such that fluid flow is relatively unimpeded over it.

It is also preferred that the bias means be a spring and that engagement between the valve and spray nozzle is effected using bayonet fittings or screw means.

It is preferred that the spring be housed in a "spring cage" which both houses and guides the spring along its axial travel. It is further preferred that in order to facilitate flow past the spring valve when it is unseated the cage is provided with apertures through it along its length and around its diameter.

As previously stated it is preferred that a bayonet type retaining means locates the cage within the valve body.

It is further preferred that the receiving bayonet type slot for the body to receive the cage lugs have ramped or sloped side walls to facilitate cage insert removal and the escape of dried product.

It is also preferred that the cage be adapted to be used with a large range of spring types and a large range of sealing membranes.

In order that the invention may be more readily understood we shall describe by way of non limiting example one particular embodiment of the invention with reference to the accompanying drawings.

BRIEF DESCRIPTION OF THE DRAWING FIGURES

FIG. 1 shows the check valve connected to an associated spray nozzle;

FIG. 2 shows an exploded diagram of the assembly shown in FIG. 1;

FIG. 7 Shows a diagrammatic representation of a valve body having a threaded spring guide and crown assembly and the press fit seat with O ring seal to the body.

DESCRIPTION OF AN EMBODIMENT OF THE INVENTION

Figure 3:
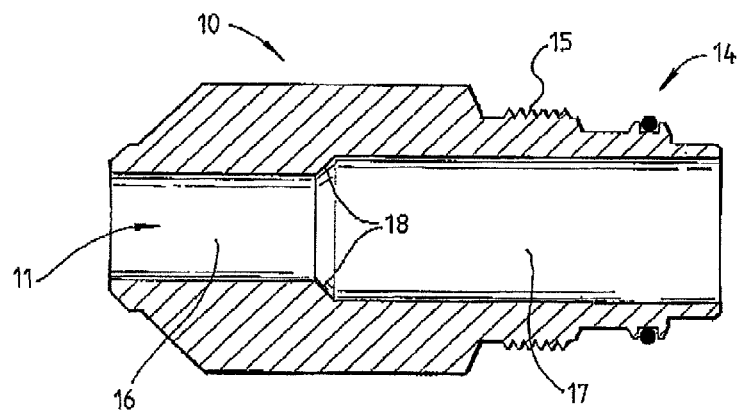
FIG. 3 shows a cross section through the body of the valve.

The check valve body 10 can be considered to be generally cylindrical with a central bore 11 and may be made of any metal suitable for the purpose to which it is to be put.

At the upstream end 12, the bore is adapted to be connected to a supply pipe for the liquid passing through the nozzle, in this case, this will be considered to be milk.

Suitable sealing means may be provided between the pipe and the valve body which could include an O-ring or the like in an annular groove in either the body, the pipe end or both.

In this embodiment of the invention the other end of the body 14 is threaded 15 to engage with a nozzle body 20 having a corresponding screw thread arrangement. The nozzle body 20 is adapted to receive an orifice disc which causes the atomisation of the milk as it passes therethrough.

In another embodiment of the invention the end 14 of the body 10 may have a bayonet type fitting over which a nozzle body having a corresponding bayonet arrangement is fitted. The precise form of connection not being restricted in the invention and it is to be understood that any preferred engagement means may be used.

The screw fitting enables ready disassembly of the nozzle for cleaning and/or maintenance and, as will be seen from the description hereafter, without disturbing the check valve.

The central bore 11 located in the valve body has two components namely a first annular bore 16 and, partway along the length thereof, a second annular bore 17 having a larger diameter than that of bore 16.

The junction between bores 16 and 17 body provides a valve seat 18 which as shown in FIG. 3 slopes towards the smaller bore 16.

A valve assembly 30 as shown in FIG. 2 has a valve member 31 on the upstream side thereof and which has a diameter smaller than the diameter of bore 17 and this has a portion 35 directed towards the nozzle with which a spring 32 may be associated which spring can abut a further annulus adjacent the downstream end of the nozzle and act against an annular portion of the valve assembly so as to normally bias the valve member 31 towards the valve seat 18.

Figure 5:
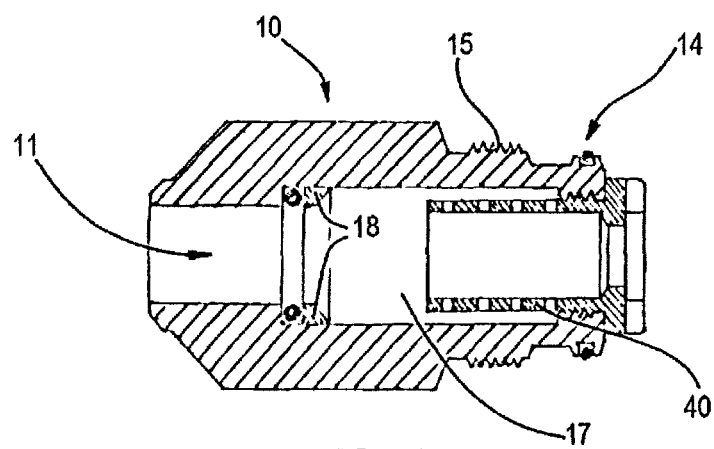
FIG. 5 Shows a perspective view of a valve member and spring assembly.

In this preferred embodiment of the invention the valve seal and spring device are not unitary and are as shown in FIG. 5 where the part of the valve which contacts the valve seat is also shown to be generally hemispherical in shape.

The valve seat 18 is manufactured from a sacrificial material and is a removable and replaceable component. The valve seat is further provided with an O ring seal to the body to prevent any leakage during the sealing phase.

In this embodiment of the invention the valve and spring assembly are located in a perforated tube 40 which acts as the spring retainer and which, in turn, can be fitted within the valve body 10. The tube 40 acts to hold spring 32 in compression and is provided with retaining means which is a bayonet fitting such that the check valve assembly remains assembled when disconnected from the spray nozzle. This arrangement causes the components of the check valve to be housed in its body in an integral fashion such that the spray nozzle can be serviced without interfering with the check valve.

If access to the check valve is required it can be disconnected from the spray nozzle and the retaining tube 40 released by releasing its bayonet fitting which in turn causes the spring to no longer be in compression such that the valve member assembly can be removed.

Figure 6:
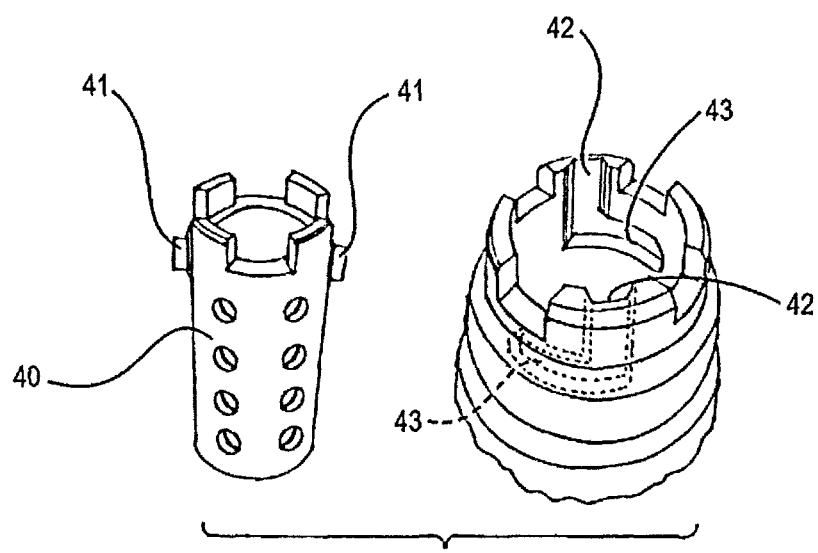
FIG. 6 Shows perspective views of the bayonet fitting receptors in the valve body and the cage with lugs to cooperate with the receptors.

As shown in FIG. 6 the spring cage 40 has large lugs 41 which are adapted to engage in the slots 42 having ramped side walls 43. This unique ramping facilitates easier cage insert removal and at the same time, on disassembly, assists the exit of any build up of dried product which has occurred.

In further embodiments of the invention other retaining options of the cage design are provided. These include a full length spring guide and crown assembly 13 as shown in FIG. 7 or alternatively a cage insert of a similar design but exclusive of a thread being a simple slip in design of similar diameter to the receiving bore in the body exclusive of any retaining design other than that of the carrier assembled over the top compressing it into place. The crown providing the stop on the body end. This figure also shows a press fit seat with O ring seal 19.

The valve member may be made of any required material but in this embodiment of the invention it includes a metal body 31 and metal generally triangular guide member 34 between a hemispheric component 33 which is of a synthetic plastics material such as PTFE or some other engineering grade plastic which can be machined or moulded.

The guide member 34 consists of a plurality of arms, preferably 3, which extend from a central portion to the sides of bore 16 and therefore provide little obstruction to fluid flow. In fact the pressure drop across the check valve is kept to a minimum by the fluid path passing from the downstream end of the valve member, through the perforations in the retaining means and through the spring to be directed down the middle of the spray nozzle in a straight path.

This component 33 seats in valve seat 18 when the valve is closed when fluid pressure upon the valve member is reduced and is of a sacrificial material compared with the metal valve seat 18. It is also possible to replace the valve member without having to machine the seat.

By use of a sacrificial material seated into a metal seat a good seal can be maintained without the use of soft O-rings which may otherwise break down and act as contaminants to the fluid being sprayed.

The component 33 described here is generally hemispherical and is adapted to seat in the truncatedly conical valve seat 18. In another embodiment of the invention it may be preferred that this valve component 33 be conical in form.

In operation, when there is no pressure in the milk line, the valve member abuts the seat and provides a good seal therebetween preventing any liquid in the line from passing through the nozzle.

When the pressure in the line increases to a pressure which would be sufficient for the nozzle to operate correctly, the valve body is caused to move against the spring towards the nozzle. Guide means 34 permits fluid flow past it and maintains the valve assembly 30 coaxially within bore 11.

In this way the amount of restriction presented to the fluid passing through the valve body is not great and the efficiency of the nozzle is not degraded to a degree sufficiently substantial to adversely effect the operation of the nozzle.

When the pressure in the line drops, the valve member moves towards the upstream end until the valve contacts the seat and further liquid is prevented from passing to the nozzle and thus to the product being treated.

This means there is no likelihood of the product being polluted by material which has a drop size very much greater than the normal atomised drops from the nozzle from which the liquid evaporates in the chamber.

Also the arrangement is such that the nozzle body can readily be removed by operation screw fitting for cleaning or replacement of the orifice disc without, in any way, adversely effecting the check valve.

Also cleaning and maintenance can be effected with the check valve in situ so the existence of this valve does not increase the time taken for normal maintenance tasks.

Whilst we have, in this specification, described one particular mechanical arrangement of the valve, it will be understood that other forms, which operate in the same manner as that described, can readily be utilised in the invention.

Figure 4:
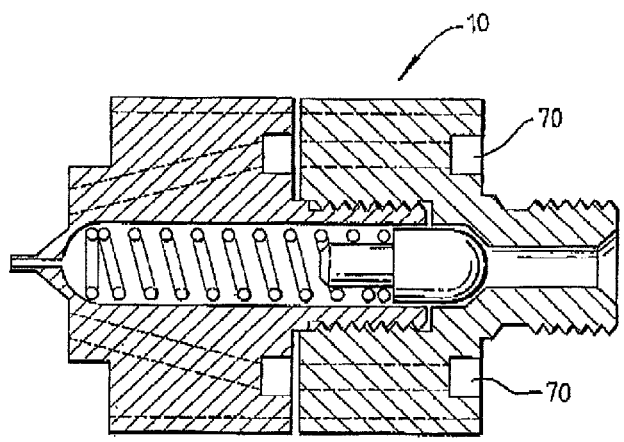
FIG. 4 shows a sectional view of a check valve associated with an air atomising nozzle.

A further example of the check valve of the invention is shown in FIG. 4 and shows the check valve of the invention when used in association with an air atomising nozzle. The operation of the valve is essentially the same as previously described however air passages 70 are present in the assembly as shown and the air aids in the break up of the fluid by air atomisation.

In addition it is to be understood that whilst the valve is particularly useful in spray drying milk it can readily be used in other applications where it is undesirable that product passes through the nozzle other than under full pressure and being atomised.

All such modifications and applications are deemed to be within the spirit and scope of the invention.

What is claimed is:

1. A check valve in a spray nozzle assembly, comprising:
   a body having an upstream end for receiving a liquid source and a downstream end for engaging a spray nozzle with a bore running continuously and parallel to an axis of said check valve through said body of said check valve and said spray nozzle from the upstream end to the downstream end;
   a first component of said bore adjacent the upstream end of said body;
   a second component of said bore adjacent the downstream end of said body, said first component having a small diameter than a diameter of said second component;
   a valve seat at a junction of said first component and said second component;
   a valve assembly located substantially in said second component and having a valve member with a curved end directed toward said valve seat;
   biasing means for holding said valve member against said valve seat until pressure at an inlet of said valve assembly attains a predetermined minimum pressure; and,
   releasable retaining means located in said second component of said bore and about said biasing means for retaining said valve assembly within said body via bayonet fittings engaging an interior of said valve body, the interior of said valve body having sloping or ramping side walls.

2. The check valve in a spray nozzle assembly according to claim 1, wherein said curved end of said valve member has a substantially conical shape.

3. The check valve in a spray nozzle assembly according to claim 1, wherein said curved end of said valve member is made of a sacrificial material and forms a valve seal with said valve seat when said valve assembly is in a closed position.

4. The check valve in a spray nozzle assembly according to claim 3, wherein said valve seat is shaped as a truncated cone.

5. The check valve in a spray nozzle assembly according to claim 1, wherein said valve assembly includes guide means for locating said valve member axially within said bore for permitting liquid to flow around said valve member when said valve assembly is in an open position.

6. The check valve in a spray nozzle assembly according to claim 5, wherein said guide means is positioned upstream of, and adjacent to, the curved end of said valve member.

7. The check valve in a spray nozzle assembly according to claim 1, wherein said biasing means is a spring.

8. The check valve in a spray nozzle assembly according to claim 7, wherein said valve member is connectable to said spring via a screw.

9. The check valve in a spray nozzle assembly according to claim 1, wherein said releasable retaining means is a perforated sleeve passing over said biasing means and retains said biasing means in a compression state when not released.

10. The check valve in a spray nozzle assembly according to claim 1, wherein fluid flows through said check valve in a substantially axial direction to the spray nozzle.

11. The check valve in a spray nozzle assembly according to claim 1, wherein said bayonet fittings comprise lugs on said releasable retaining means for engaging said sloping or ramping side walls.

12. The check valve in a spray nozzle assembly according to claim 11, wherein said sloping or ramping side walls are formed as L-shaped bayonet slots.

13. The check valve in a spray nozzle assembly according to claim 1, wherein said valve assembly is retained within said body via said releasable retaining means for providing a unitary check valve.

14. The check valve in a spray nozzle assembly according to claim 1, wherein said valve member includes guide means having a plurality of arms extending from an axial portion to sides of said first component.

* * * * *